(12) United States Patent
Lamberton et al.

(10) Patent No.: US 7,373,510 B2
(45) Date of Patent: May 13, 2008

(54) SYSTEM AND METHOD FOR IMPLEMENTING A ROBOT PROOF WEB SITE

(75) Inventors: Marc Lamberton, Antibes (FR); Eric Levy-Abegnoli, Nice (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 1172 days.

(21) Appl. No.: 09/901,442

(22) Filed: Jul. 9, 2001

(65) Prior Publication Data

US 2002/0032869 A1 Mar. 14, 2002

(30) Foreign Application Priority Data

Sep. 12, 2000 (EP) ................... 00480085

(51) Int. Cl.
*G06F 1/24* (2006.01)
(52) U.S. Cl. .............. 713/170; 713/164; 713/166; 713/167; 713/168; 713/194
(58) Field of Classification Search ........... 713/170, 713/164, 166, 167, 168, 194, 200, 201
See application file for complete search history.

(56) References Cited

U.S. PATENT DOCUMENTS 5,867,495 A * 2/1999 Elliott et al. ............ 370/352
5,949,876 A * 9/1999 Ginter et al. ............ 705/80

FOREIGN PATENT DOCUMENTS

JP 11-296481 10/1999
KR PUPA 2000-54521 9/2000

OTHER PUBLICATIONS

Hiroshi Yuhki, "CGL Lession—Learning by C. S. Perl", Oct. 1, 1999.
Hiroshi Yuhki, "Introduction to CGL Created by Perl", Jul. 30, 1998.
Yuki, H.; CGI Lessons Using C&Perl (the 18th lesson)—For Creation of Attractive Web—Daily Quiz; C Magazine, vol. 11, No. 10, Softbank Publishing, Inc.; Oct. 1, 1999, pp. 168-173.
Yuki, H.; Introduction of CGI Creation Using Perl-Application Version; first edition; Softbank Publishing, Inc.; Jul. 30, 1998, pp. 379-399.
JPI Version 6 JPI1/Remote Control; Operation Manual, Hitachi Ltd., Jun. 30, 2000, Version 1, pp. 141-146.

* cited by examiner

*Primary Examiner*—Thomas R. Peeso
(74) *Attorney, Agent, or Firm*—Joseph E. Bracken, Esq.; Steven M. Greenberg, Esq.; Carey Rodriguez Greenberg & Paul LLP

(57) ABSTRACT

The invention prevents robots from browsing a Web site beyond a welcome page. When an initial request from an undefined originator is received, the Web site responds to it with a welcome page including a challenge. Then, on receiving a further request from the undefined originator, the Web site can check whether the challenge is fulfilled or not. If fulfilled, the undefined originator is assumed to be a human being and authorized to go on. If the challenge is not fulfilled, the undefined originator is assumed to be a robot, in which case site access is further denied.

The invention prevents Web site contents from being investigated by robots while not requiring users to have to log on.

30 Claims, 4 Drawing Sheets

```
[140]
<!doctype html public "-//w3c//dtd html 4.0 transitional//en">
<html><head><title>Cross</title></head>
<body text="#000000" bgcolor="#000000" link="#0000EE" vlink="#551A8B" alink="#FF0000">

<h1><i><font color="#3366FF">Welcome Page</font></i></h1></center>

<hr WIDTH="100%"><br>                                   [142]
<a href="/cgi-bin/challenge.exe?id=XD34F739"><img SRC="cross.gif" ismap ...
           [141]            [143]
                                               ... height=135 width=183></a>
</body>
</html>
                            [149]
```

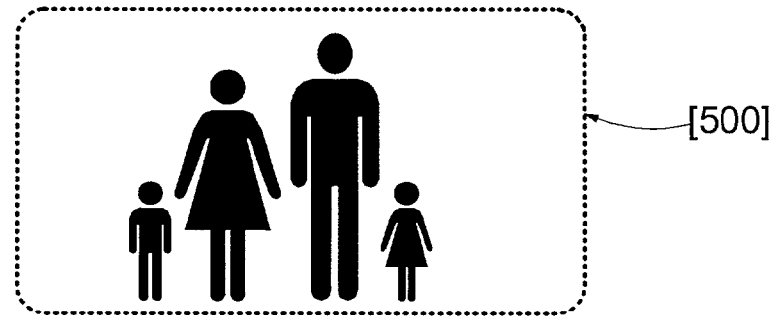
To Go Further Please, Tell us Who is the Tallest ?
[510]
Figure 5-a
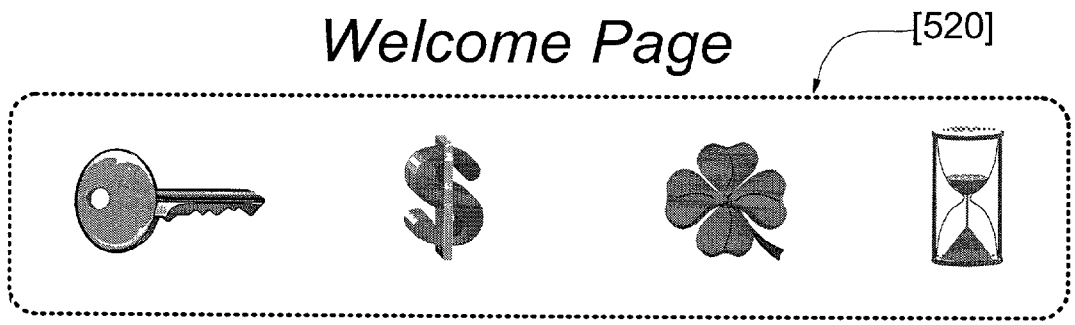
To Enter this Site a Key is not Necessary, Money will not Let you IN, Waiting will not Help, All you Really Need is Luck !
[530]
Figure 5-b

SYSTEM AND METHOD FOR IMPLEMENTING A ROBOT PROOF WEB SITE

FIELD OF THE INVENTION

The present invention relates to the Internet and more particularly applies to those of the World Wide Web (WWW) sites that, while welcoming human beings, want to exclude robots from visiting and gathering information from them.

BACKGROUND OF THE INVENTION

WWW robots, also called Web Wanderers, Web Crawlers or Web Spiders, and often just referred to as bots (bot is short for robot), are programs devised to automatically traverse the hypertext structure of the Web. Such bots, having retrieved a document, can also recursively retrieve all the linked pages referenced in the document. This is especially the case of numerous search engines and their robots which roam the World Wide Web finding and indexing content to add to their databases. Although most robots provide a valuable service, concern has developed amongst Web site administrators about exactly how much of their precious server time and bandwidth is being used to service requests from these engines.

While the majority of robots are well designed, are professionally operated and cause no problems, there are occasions where robots visiting Web servers are not welcome because of the way robots behave. Some may swamp servers with rapid-fire requests, or retrieve the same files repeatedly. If done intentionally this is a form of Denial of Service (DoS) attack, although this is more often just the result of a poor or defective robot design. In other situations robots traverse parts of WWW servers that are not suitable for being searched e.g., contain duplicated or temporary information, include large documents or e.g., CGI scripts (CGI is a standard for running external programs from a World-Wide Web HTTP server). In this latter case and in similar situations, when accessed and executed, scripts tend to consume significant server resources in generating dynamic pages and thus, slow down the system.

In recognition of these problems many Web robots offer facilities for Web site administrators and content providers to limit what the robot is allowed to do. Two mechanisms are provided. One is referred to as the 'Robots Exclusion Protocol', even though it is not really an enforced protocol, but was a working draft document discussed as an Internet-Draft by the Internet Engineering Task Force (IETF) in 1996 under the title 'A Method for Web Robots Control'. According to this document, a Web site administrator can indicate which parts of the site should not be visited by a robot. This is accomplished by providing a specially formatted file, in http://.../robots.txt. The second mechanism assumes that a Web author can indicate whether a page may or may not be indexed, or analyzed for links, through the use of a special Hyper Text Markup Language (HTML) META tag i.e., a 'Robots META tag'. However, both of these mechanisms rely on cooperation from the robots, and are not even guaranteed to work for every robot. Moreover, as already suggested here above relative to DoS attacks, some of these robots may not be so friendly. They could be run e.g., with the malicious intent of attacking a Web site (then, they just ignore the robots.txt file and the robots meta tags) so the site becomes overloaded and starts refusing to serve legitimate users i.e., the human beings trying to make normal use of the site.

Also, although the information made available on a site may not be confidential, an administrator may want to prevent the unlimited dissemination of it that would otherwise result from the indexing and referencing activities of all sorts of robots. The standard way of achieving this is to protect a Web site through some form of authentication, of which the more common method is to manage a list of registered users having a password so as they have to sign on upon accessing the site. The obvious drawback of this is that administrators must manage and update a closed list of users. This requires a registration step for a first consultation of a site and also assumes that users will remember their passwords in subsequent consultations. This may not be at all what the administrator wanted to achieve, and may even be counterproductive, since it will certainly discourage some individuals who are willing to browse a site to go further if they are requested to register.

OBJECT OF THE INVENTION

Thus, it is a broad object of the invention to prevent Web site contents from being investigated by robots.

It is a further object of the invention to encourage human beings, attempting to access a robot protected Web site, to proceed further by not imposing a registration at first access and a log on procedure at each subsequent access.

It is still another object of the invention to avoid reliance on a robot's cooperation for barring the robot's access to contents of Web sites.

Further objects, features and advantages of the present invention will become apparent to the ones skilled in the art upon examination of the following description in reference to the accompanying drawings. It is intended that any additional advantages be incorporated herein.

SUMMARY OF THE INVENTION

A method and a system for preventing robots from browsing a Web site beyond a welcome page are described. On receiving an initial request from an undefined originator, the Web site responds to the request with a welcome page including a challenge. Then, on receiving a further request from the undefined originator, the Web site can check whether the challenge is fulfilled or not. If fulfilled, the undefined originator is assumed to be a human being and the site keeps processing the further request and all subsequent ones, if any. However, if the challenge is not fulfilled, the undefined originator is assumed to be a robot, in which case all requests from that originator are not further processed.

The invention prevents Web site contents from being investigated by robots without requiring end users to register or the site administrator to have to manage an access list of authorized users.

BRIEF DESCRIPTION OF THE DRAWINGS

FIG. 5 are other exemplary welcome pages with challenges.

DETAILED DESCRIPTION OF THE PREFERRED EMBODIMENT

Figures 1, 2:
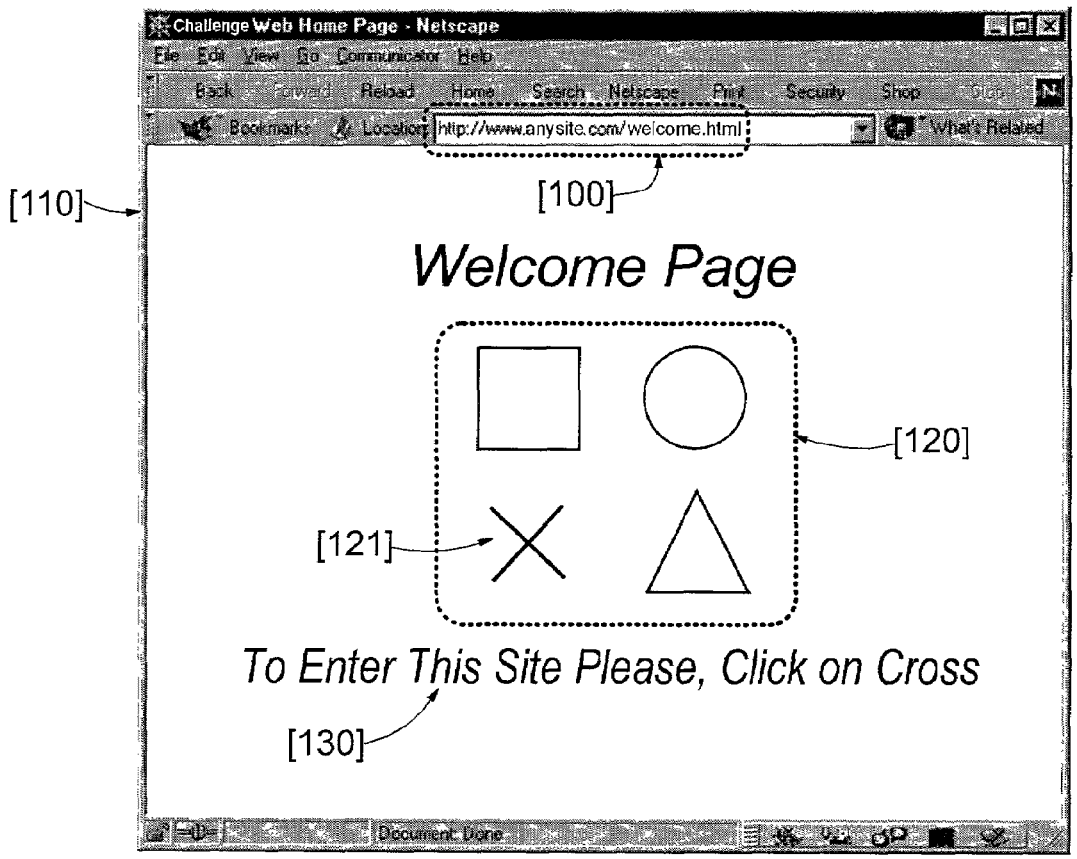
FIG. 1 is an exemplary welcome page per the invention.
FIG. 2 shows the corresponding HTML code.

FIG. 1 illustrates the method according to the invention to prohibit robots from accessing a Web site beyond its welcome page. An exemplary welcome page as seen by an individual accessing a Web site e.g., at following URL [100] (Uniform Resource Locator) 'http://www.anysite.com/welcome.html' is shown. Accessing a Web site can be done with any available Web browser e.g., Netscape browser [110] from Netscape Communications Corporation, 501 E. Middlefield Road, Mountain View, Calif. 94043, USA can be used. Then, according to a first method to prohibit robot's access, the welcome page implements a dummy challenge that can be simply answered by a human being, but which a robot should certainly fail.

Among various possibilities, FIG. 1 illustrates a typical challenge according to the invention. The welcome page thus shows an image [120] including, in this particular example, a few geometric forms that can be unambiguously referred to by a single word or expression in a language that the individual accessing the Web is assumed to be capable of reading. Then, associated with the image which, as depicted here, includes a square, a circle, a cross and a triangle, the reader is prompted [130] to click e.g., on the cross [121]. A human being, desiring to go on and visit the site, will do it naturally while a robot will do nothing, or will do it wrongly simply because it just does not understand the graphic symbols or which of them may be a cross. Hence, this imention easily allows discrimination of a human being from a robot on the basis of their respective levels of abstract reasoning, which is naturally high, or very high, for a human being while a robot is totally lacking this capacity. This allows achievement of the objectives of the invention to prevent robots from browsing the site beyond the welcome page, while neither imposing to the people accessing it the burden of having to register and to log on, nor requiring the administrators of the site to manage a list of legitimate users.

To make the site even more resistant to browsing by a "smart" robot that could be tailored to adapt to a given challenge or set of predictable such challenges, prompting can be made random so that every time someone accesses the site, the challenge is different. For example, the cross can be moved to a different position on the image map so that the coordinates returned, when clicking on it, are different. Or, the prompting requst can change in requesting e.g., to click on triangle instead.

FIG. 2 shows the source HTML (Hyper Text Markup Language) code [140] for this example which uses a server side map i.e., ismap [142], included in an anchor tag created with the <a . .>. .</a> construct form [149] of the HTML language. Thus, when the user clicks on the cross [121], the browser sends a request back to the server URL (/cgi-bin/challenge.exe) [141] including the X and Y coordinates of the user's click contained in an ismap [142] so that the server can check whether the click coordinates indeed matche the cross position. The anchor tag also carries an identification field i.e., id=XD34F739 [143] which is useful to correlate the answer, including the click coordinates, with the current challenge when this latter changes from one user to another as explained above.

Figure 3:
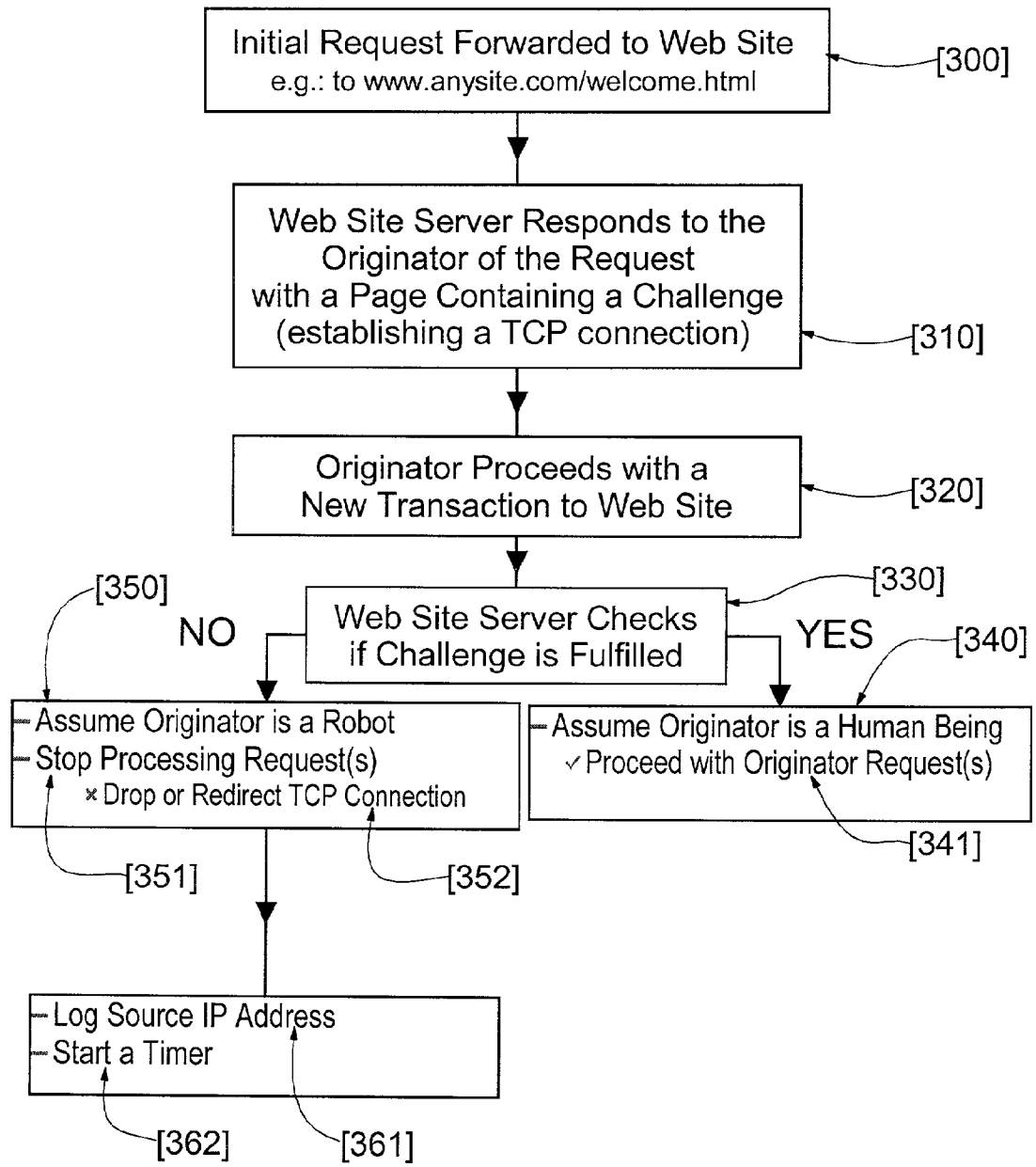
FIG. 3 shows the steps of the method of the invention.

FIG. 3 depicts the steps of the method according to the invention when an originator of an initial request to access a Web site is responded to with a challenge. Upon receiving this initial request, the [300] Web site server responds with the challenge [310]. This is done through the establishment of a TCP connection with the originator (the reliable transport protocol of the Internet TCP/IP suite of protocols used by the Web). The response is in the form of a Web page including a challenge e.g., of the kind discussed in FIG. 1.

Then, having gotten the server's response, the originator proceeds with a new transaction containing his click response directed towards the Web site [320]. On receiving the new transaction, the Web site server checks whether the challenge is fulfilled or not [330]. If the response matches the challenge prompt [340], then the site server assumes that the originator is a human being and permits further access. However, if the Web server finds that challenge is not properly answered, it must assume that the originator is a robot [350]. As a consequence, it stops processing all current and further requests, if any [351], which includes dropping the TCP connection or redirecting it to another site [352]. Also, the IP source address [361] may be remembered and a timer started [362] so that access to the site may be temporarily barred, from that IP source address, as explained in FIG. 4.

Figure 4:
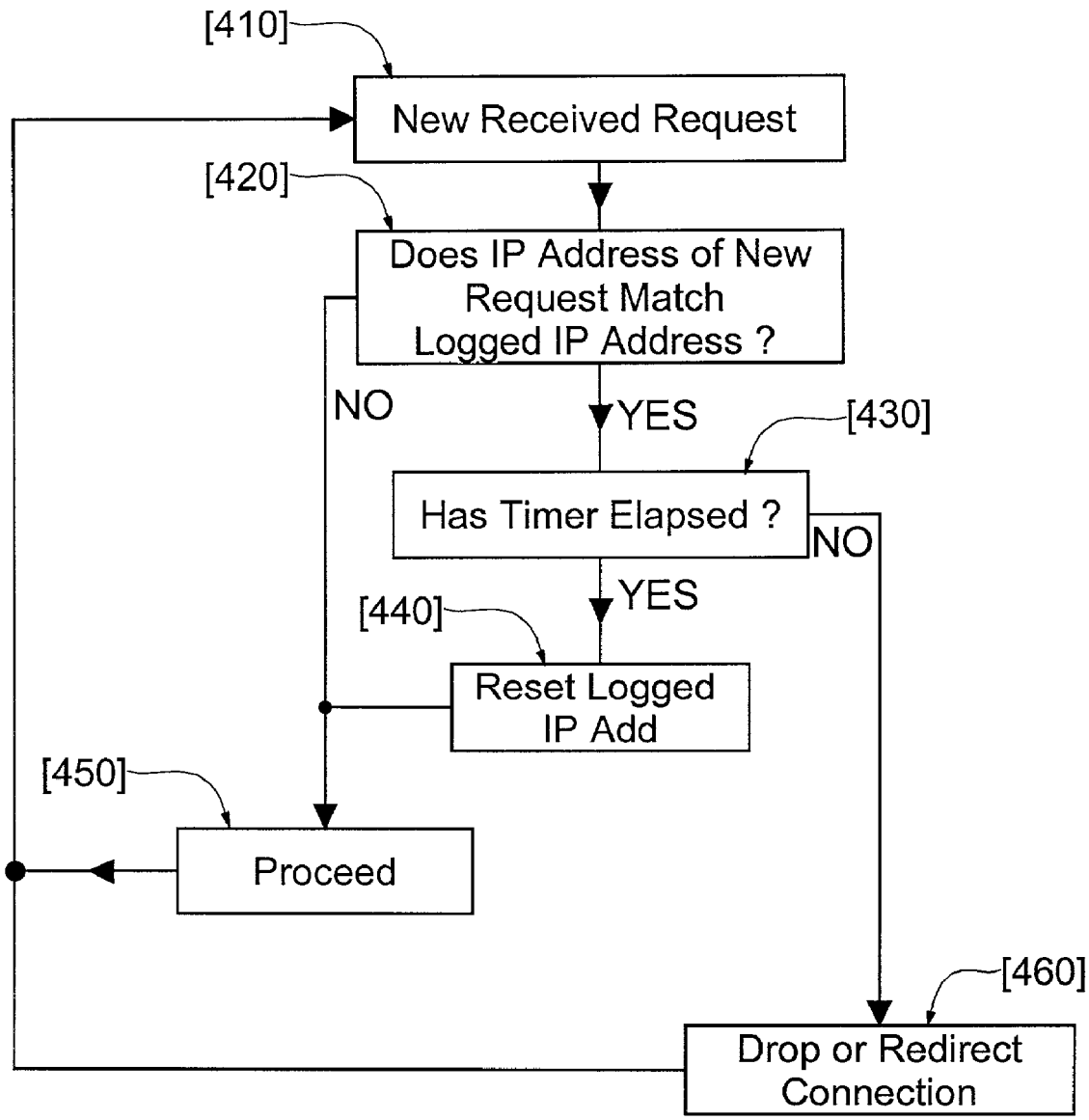
FIG. 4 shows the further steps of the method when access to a Web site per the invention is denied, while a timer is on, for requests carrying a logged IP address.

FIG. 4 shows the case where the IP address of an assumed robot originator is remembered. Then, the server may be implemented to temporarily drop or redirect immediately all requests issued with this particular source IP address, because all subsequent access requests thereafter are assumed to come from a robot (although this might not always be true since a robot may be behind a proxy or firewall performing a network address translation of all the IP source addresses it has to forward). Because the IP source address of the request was logged and a timer started as explained in FIG. 3, each time a new request is received [410] the server first checks for whether the same logged source IP address is found [420]. If not the same address, access may proceed normally [450]. If the address is the same, however, a timer is checked [430]. If the timer interval has elapsed, the logged IP address is reset [440] and new request is normally handled [450], i.e. a new challenge is issued. However, if timer has not elapsed, the TCP connection is dropped or redirected [460] before the server resumes handling of newly received requests [410].

FIG. 5 illustrates other exemplary challenge examples that are easily answered by human beings.

FIG. 5-a takes the form of a quiz [510] which could be made as simple as shown [500] or as sophisticated as necessary to defeat elaborated or "smart" robots or, alternatively, to adapt to a particular end-user population sharing a common type of skill.

FIG. 5-b is another alternative that combines images [520] and text [530] in an even more abstract way where the answer is suggested by the text, so it is even better adapted to discriminate a human being from a robot. However, it is worth mentioning here that such a challenge is culture-dependent and could serve as well to discriminate human beings on the basis of their social or ethnic origins.

What is claimed is:

1. A method for preventing robots from browsing a Web site beyond a welcome page, said method in said Web site comprising the steps of:

receiving an initial request from an undefined originator and responding to said initial request with a challenge that prompts a response from said undefined originator; and receiving a response from said undefined originator and checking said response to determine whether said challenge is fulfilled; and if said challenge is fulfilled:

processing any further requests; and if said challenge is not fulfilled:

stopping processing of any further requests, wherein said step of stopping processing of said further requests includes the further step of:

dropping or redirecting a TCP connection established with said undefined originator logging a source IP address of said undefined originator and starting a timer, further including steps upon receiving a new request of:

checking whether a source IP address of said new request matches said logged source IP address; and if said source IP address matches said logged source IP address:

checking whether said timer has expired and, if said timer is expired, resetting said logged IP address; and proceeding normally with said new request; and if said timer is not expired, dropping or redirecting said TCP connection;

if said source IP address does not match said logged source IP address, proceeding normally with said new request and executing all the above steps with each newly received request.

2. The method according to claim 1 wherein:

said challenge includes prompting said undefined originator to perform a specific action.

3. The method according to claim 2 wherein:

said prompting is different at each subsequent access of said web site.

4. The method according to claim 3 wherein:

said response includes making a choice among a plurality of prompted response options.

5. The method according to claim 4, wherein said response includes an answer to a quiz.

6. The method according to claim 3, wherein said response includes an answer to a quiz.

7. The method according to claim 2, wherein said response includes an answer to a quiz.

8. The method according to claim 2, wherein said response is suggested by textual meaning.

9. The method according to claim 1 wherein:

said prompting is different at each subsequent access of said web site.

10. The method according to claim 9 wherein:

said response includes making a choice among a plurality of prompted response options.

11. The method according to claim 10, wherein said response includes an answer to a quiz.

12. The method according to claim 9, wherein said response includes an answer to a quiz.

13. The method according to claim 1 wherein:

said response includes making a choice among a plurality of prompted response options.

14. The method according to claim 13, wherein said response includes an answer to a quiz.

15. The method according to claim 13, wherein said response is suggested by textual meaning.

16. The method according to claim 9, wherein said response is suggested by textual meaning.

17. The method according to claim 1, wherein said response includes an answer to a quiz.

18. The method according to claim 17, wherein said response is suggested by textual meaning.

19. The method according to claim 1, wherein said response is suggested by textual meaning.

20. A computer process for preventing robots from browsing a web site beyond a welcome page, comprising computer-executable steps of:

receiving an initial request from an undefined originator and responding to said initial request with a challenge that prompts a response from said undefined originator; and receiving a response from said undefined originator and checking said response to determine whether said challenge is fulfilled; and if said challenge is fulfilled:

processing any further requests; and if said challenge is not fulfilled:

stopping processing of any further requests, wherein said step of stopping processing of said further requests includes the further step of:

dropping or redirecting a TCP connection established with said undefined originator logging a source IP address of said undefined originator and starting a timer, further including computer-executable steps for:

checking whether a source IP address of said new request matches said logged source IP address; and if said source IP address matches said logged source IP address:

checking whether said timer has expired and, if said timer is expired, resetting said logged IP address; and proceeding normally with said new request; and if said timer is not expired, dropping or redirecting said TCP connection;

if said source IP address does not match said logged source IP address, proceeding normally with said new request and executing all the above steps with each newly received request.

21. A computer process according to claim 20, further including computer-executable steps for:

prompting said undefined originator to perform a specific action.

22. A computer process according to claim 21, further including computer-executable steps for:

prompting said undefined originator to make a response chosen from among a plurality of prompted response options.

23. A computer process according to claim 20, further including computer-executable steps for:

changing said prompting at each access of said website.

24. A computer process according to claim 23, further including computer-executable steps for:

prompting said undefined originator to make a response chosen from among a plurality of prompted response options.

25. A computer process according to claim 20, further including computer-executable steps for:

prompting said undefined originator to make a response chosen from among a plurality of prompted response options.

26. A computer process according to claim 20, further including computer-executable steps for:

prompting said undefined originator to make a response chosen from among a plurality of prompted response options.

27. A computer process according to claim 20, further including computer-executable steps for:

prompting said undefined originator to make a response that is an answer to a quiz.

28. A computer process according to claim 20, further including computer-executable steps for:

prompting said undefined originator to make a response based upon the knowledge content of said prompt.

29. The method according to claim 2 wherein:

said response includes making a choice among a plurality of prompted response options.

30. The method according to claim 29, wherein said response includes an answer to a quiz.

* * * * *